US010696188B2

(12) United States Patent
Kanemori et al.

(10) Patent No.: US 10,696,188 B2
(45) Date of Patent: Jun. 30, 2020

(54) VEHICLE

(71) Applicant: Mitsubishi Heavy Industries Engineering, Ltd., Yokohama-shi, Kanagawa (JP)

(72) Inventors: Toru Kanemori, Tokyo (JP); Nobuyuki Fujio, Tokyo (JP); Yoshiki Okubo, Tokyo (JP); Ryuji Karasawa, Hiroshima (JP)

(73) Assignee: MITSUBISHI HEAVY INDUSTRIES ENGINEERING, LTD., Yokohama-Shi, Kanagawa (JP)

( * ) Notice: Subject to any disclaimer, the term of this patent is extended or adjusted under 35 U.S.C. 154(b) by 377 days.

(21) Appl. No.: 15/574,680

(22) PCT Filed: Jul. 15, 2016

(86) PCT No.: PCT/JP2016/071014
§ 371 (c)(1),
(2) Date: Nov. 16, 2017

(87) PCT Pub. No.: WO2017/018251
PCT Pub. Date: Feb. 2, 2017

(65) Prior Publication Data
US 2018/0126874 A1    May 10, 2018

(30) Foreign Application Priority Data

Jul. 28, 2015    (JP) .................................. 2015-148822

(51) Int. Cl.
*B60N 2/01*        (2006.01)
*B61D 1/04*        (2006.01)
(Continued)

(52) U.S. Cl.
CPC ............. *B60N 2/012* (2013.01); *B60N 2/005* (2013.01); *B60N 2/015* (2013.01); *B60N 2/242* (2013.01);
(Continued)

(58) Field of Classification Search
CPC ...... B61D 1/04; B61D 19/005; B61D 19/007; B61D 33/0014; B61D 33/0057;
(Continued)

(56) References Cited

U.S. PATENT DOCUMENTS 1,768,060 A    6/1930   Heinen et al.
4,061,089 A    12/1977  Sawyer
(Continued)

FOREIGN PATENT DOCUMENTS

CN    1449469 A      10/2003
CN    202827227 U    3/2013
(Continued)

OTHER PUBLICATIONS

PCT/ISA/210, "International Search Report for International Application No. PCT/JP2016/071014," dated Oct. 4, 2016.
(Continued)

*Primary Examiner* — Ryan A Reis
(74) *Attorney, Agent, or Firm* — Manabu Kanesaka; Benjamin Hauptman; Kenneth Berner (57) ABSTRACT

Provided is a vehicle including the following: a vehicle body having side walls on both sides in a width direction that is perpendicular to the direction of travel, and having an expanded portion between the upper end and the lower end of the side wall, the expanded portion being expanded further outward in the width direction than the upper end and the lower end; and a seat provided in the vehicle body and having a seatback along the side wall and a seat surface that extends inward in the width direction of the vehicle body (Continued)

from the seatback, the portion of the rear surface of the seatback that faces the side wall and that protrudes the farthest towards the side wall being disposed in a position facing the expanded portion of an in-vehicle-side lateral surface of the side wall.

4 Claims, 5 Drawing Sheets

(51) Int. Cl.

| | | |
|---|---|---|
| *B61D 33/00* | (2006.01) | |
| *B61D 19/00* | (2006.01) | |
| *B60N 2/005* | (2006.01) | |
| *B60N 2/24* | (2006.01) | |
| *B60N 2/28* | (2006.01) | |
| *B60N 2/30* | (2006.01) | |
| *B60N 2/015* | (2006.01) | |
| *B61B 9/00* | (2006.01) | |
| *B61D 17/04* | (2006.01) | |
| *B62D 31/02* | (2006.01) | |
| *B61F 1/14* | (2006.01) | |

(52) U.S. Cl.
CPC ............ *B60N 2/283* (2013.01); *B60N 2/3011* (2013.01); *B61B 9/00* (2013.01); *B61D 1/04* (2013.01); *B61D 17/043* (2013.01); *B61D 19/005* (2013.01); *B61D 33/0014* (2013.01); *B61D 33/0035* (2013.01); *B61D 33/0064* (2013.01); *B61D 33/0078* (2013.01); *B62D 31/025* (2013.01); *B61F 1/14* (2013.01)

(58) Field of Classification Search
CPC .... B61D 33/0064; B60N 2/005; B60N 2/012; B60N 2/242; B60N 2/283; B60N 2/2833
See application file for complete search history.

(56) References Cited

U.S. PATENT DOCUMENTS

| | | | |
|---|---|---|---|
| 5,834,909 A | 11/1998 | Malfent et al. | |
| 8,579,350 B2* | 11/2013 | Masters | A47C 9/06 |
| | | | 296/64 |
| 2003/0209922 A1* | 11/2003 | Emmons | B60G 7/02 |
| | | | 296/203.01 |
| 2005/0098060 A1 | 5/2005 | Bigda et al. | |
| 2014/0130705 A1 | 5/2014 | Zona et al. | |
| 2014/0150688 A1* | 6/2014 | Taguchi | B61D 17/08 |
| | | | 105/413 |

FOREIGN PATENT DOCUMENTS

| | | | |
|---|---|---|---|
| CN | 203460871 U | | 3/2014 |
| CN | 103826957 A | | 5/2014 |
| CN | 104527686 A | * | 4/2015 |
| CN | 104527686 A | | 4/2015 |
| CN | 204296737 U | | 4/2015 |
| EP | 1245436 A1 | | 10/2002 |
| FR | 2822765 A1 | | 10/2002 |
| GB | 191505437 A | | 9/1915 |
| JP | H10-067263 A | | 3/1998 |
| JP | 2002-205641 A | | 7/2002 |
| JP | 2007-325673 A | | 12/2007 |
| JP | 2010-221933 A | | 10/2010 |
| JP | 2013-111581 A | | 6/2013 |
| JP | 2014-054949 A | | 3/2014 |
| JP | 2015-033894 A | | 2/2015 |
| JP | 2015033894 A | * | 2/2015 |
| WO | 2013/001409 A1 | | 1/2013 |

OTHER PUBLICATIONS

PCT/ISA/237 "Written Opinion of the International Searching Authority for International Application No. PCT/ JP2016/071014," dated Oct. 4, 2016.

* cited by examiner

VEHICLE

TECHNICAL FIELD

The present invention relates to a vehicle.

Priority is claimed on Japanese Patent Application No. 2015-148822, filed on Jul. 28, 2015, the content of which is incorporated herein by reference.

BACKGROUND ART

In vehicles (referred to as a new transport system, AGT (Automated Guideway Transit), or APM (Automated People Mover)) for track-based transportation system traveling on a track while being guided by a guide rail provided in the track, other passenger vehicles for railway, or vehicles such as a bus, a seat may be provided, which is installed inward in a width direction of the vehicle inside a side wall provided on a side in a travel direction (forward and backward directions) of the vehicle. PTLs 1 and 2 disclose a seat in which a seatback is fixed to a vehicle inner side surface of a side wall.

CITATION LIST

Patent Literature

[PTL 1] Japanese Unexamined Patent Application Publication No. 2007-325673
[PTL 2] Japanese Unexamined Patent Application Publication No. 2002-205641

SUMMARY OF INVENTION

Technical Problem

As described above, when the seat installed inward in the width direction of the vehicle is provided, for example, in a case where the maximum dimension in the width direction of the vehicle is limited, the height of the seatback or the dimension of the seat portion in the forward and backward directions increases in order to increase seatability of the seat, or the like, a space such as a passageway formed between seats on both side in the vehicle width direction is narrowed. As a result, there is a problem that comfort of passengers riding in a state of standing on a passageway is impaired or the maximum number of passengers is reduced.

The present invention is made in consideration of the above-described circumstances, and an object thereof is to provide a vehicle capable of effectively using a space in the vehicle.

Solution to Problem

The present invention adopts the following means in order to achieve the above-described object.

According to a first aspect of the present invention, there is provided a vehicle including: a vehicle body which is formed in a box shape and includes side walls on both sides in a width direction orthogonal to a travel direction and an expanded portion which is formed between an upper end and a lower end of the side wall so as to be expanded outward in the width direction from the upper end and the lower end; and a seat which is provided inside the vehicle body and includes a seatback along the side wall and a seat surface extending from the seatback inward in the width direction of the vehicle body, and in which a portion of a rear surface of the seatback which faces the side wall and protrudes farthest toward the side wall side is positioned at a position facing the expanded portion of a vehicle inner side surface of the side wall.

According to this configuration, the portion of the rear surface of the seatback of the seat which protrudes farthest toward the side wall side is positioned at the position facing the expanded portion of the vehicle inner side surface of the side wall, that is, is disposed at the position of the vehicle inner side surface which is positioned outermost in the width direction. Accordingly, it is possible to dispose the seat at the position closest to the outside in the vehicle width direction. Therefore, the space such as a passageway formed between the seats on both sides in the vehicle width direction can be secured to the maximum width.

According to a second aspect of the present invention, in the first aspect, the seat may include a frame which is fixed to the side wall and supports the seatback and the seat surface, and an upper end of the frame may be fixed to the side wall at a position below the position of the vehicle inner side surface of the side wall facing the expanded portion.

Accordingly, since the upper end of the frame is fixed to the side wall at the position below the position of the vehicle inner side surface of the side wall facing the expanded portion, compared to a case where the frame is fixed to the expanded portion, the frame can be more easily fixed. In addition, since the upper end of the frame is fixed at the position below the position facing the expanded portion, for example, in a case where a window is attached to the side wall, it is possible to increase a dimension in a height direction of the window. Therefore, it is possible to increase feeling of opening in the internal space of the vehicle body, and thus, comfort of a passenger is improved, which leads to an improvement in design of the exterior.

According to a third aspect of the present invention, in the first or second aspect, the vehicle may further include a door rail which is provided on the vehicle outer side surface of the side wall of the vehicle body so as to extend in the travel direction, and a side sliding door which is provided on the outside in the width direction from the vehicle outer side surface of the side wall and slides along the door rail, and the door rail may be disposed in at least one of the upper side and the lower side of the expanded portion and may be provided inward in the width direction of the vehicle body from the expanded portion.

In a case where the door rail and the side sliding door are provided on the vehicle outer side surface of the side wall outward in the width direction, according to the regulation of vehicle limits of the vehicle body, it is necessary to install the side wall inward in the width direction by the dimensions of the door rail and the side sliding door in the width direction. As a result, the dimension in the internal space of the vehicle body in the width direction is decreased. Meanwhile, the door rail is disposed above (below) the expanded portion and the expanded portion is disposed below (above) the door rail. Accordingly, the width dimension in the internal space in the expanded portion increases, and thus, the maximum width dimension of the internal space of the vehicle body can be secured.

In a fourth aspect of the present invention, in any one of the first to third aspects, the vehicle may further include a window portion which is provided on the side wall, and an upper end of the seatback may protrude upward from a lower edge of the window portion.

According to this configuration, the upper end of the seatback protrudes upward from the lower edge of the window portion while the seat is mounted at the position closest to the outside in the vehicle width direction. Therefore, the dimension in the height direction of the seatback can be largely secured, and it is possible to improve comfort at the time of seating. In addition, the lower edge of the window portion is positioned below the upper end of the seatback. Therefore, it is possible to increase the dimension in the height direction of the window portion. As a result, it is possible to increase feeling of opening in the internal space of the vehicle body. Accordingly, design of the exterior is improved.

According to a fifth aspect of the present invention, in any one of the first to fourth aspects, the upper end and the expanded portion may be linearly connected to each other and the lower end and the expanded portion may be linearly connected to each other in the side wall, and a sectional shape of the vehicle body in a vertical surface orthogonal to the travel direction may be hexagonal.

In this way, the expanded portion is provided on the side wall, the sectional shape of the vehicle body is hexagonal, and the seat can be disposed to be close to the outside in the width direction. As a result, the space such as a passageway formed between the seats on both sides in the vehicle width direction can be secured to the maximum width. In addition, the outline of the vehicle body can be formed to be characteristic.

Advantageous Effects of Invention

According to the vehicle of the present invention, the space such as a passageway is secured to the maximum width, and thus, it is possible to effectively use the space inside the vehicle.

DESCRIPTION OF EMBODIMENTS

Hereinafter, a vehicle according to an embodiment of the present invention will be described with reference the drawings.

As shown in FIGS. 1 to 4, for example, a vehicle 1 of this embodiment is used in a track-based transportation system.

The vehicle 1 includes a vehicle body 2, a door 5 (refer to FIGS. 2 and 3) which is provided in the vehicle body 2, and seats 3 (refer to FIGS. 3 and 4) which are provided inside the vehicle body 2.

Figure 1:
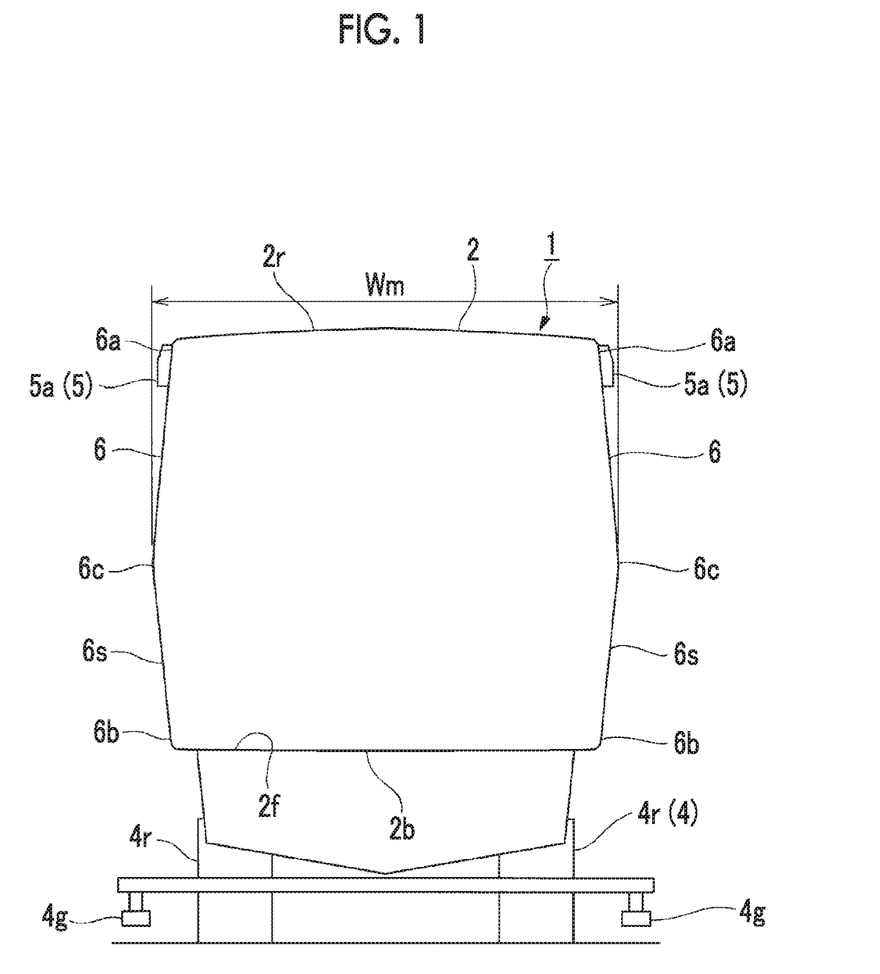
FIG. 1 is a front view showing a vehicle in an embodiment of the present invention.
Figure 2:
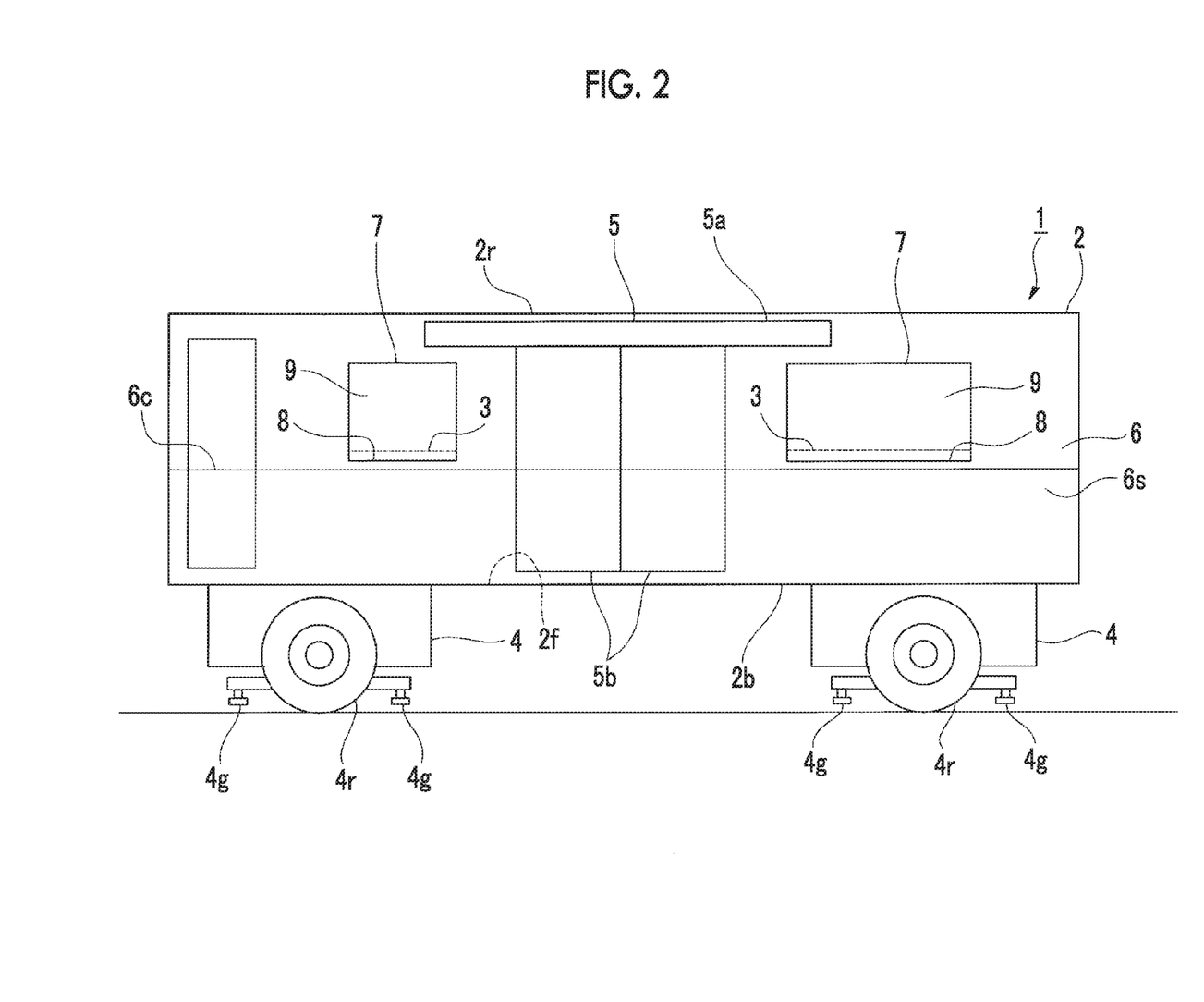
FIG. 2 is a side view of the vehicle in the embodiment of the present invention.

The vehicle body 2 is formed in a box shape. For example, the vehicle body 2 is formed in a hollow rectangular parallelepiped shape including a passenger compartment PS in which a passenger is accommodated. As shown in FIGS. 1 and 2, traveling wheels 4r and traveling devices 4 are provided on both ends in a longitudinal direction of the vehicle body 2 below the base 2b which forms a vehicle floor surface 2f of the vehicle body 2. Each of the traveling devices 4 includes guide wheels 4g which guide an advancement direction along a track.

As shown in FIG. 1, the vehicle body 2 includes side walls 6 which are provided on both sides in a width direction intersecting the longitudinal direction (travel direction of the vehicle 1).

Each of the side walls 6 includes an upper end 6a, a lower end 6b, and an expanded portion 6c which is expanded outward in the width direction at an intermediate portion in up and down directions between the upper end 6a and the lower end 6b. In this embodiment, in the side wall 6, each of a portion between the upper end 6a and the expanded portion 6c and a portion between the expanded portion 6c and the lower end 6b is formed in a flat plate shape. Here, a width dimension Wm between the expanded portions 6c of the side walls 6 on both sides of the vehicle body 2 in the vehicle width direction becomes a vehicle maximum width dimension of the vehicle body 2.

Figure 5:
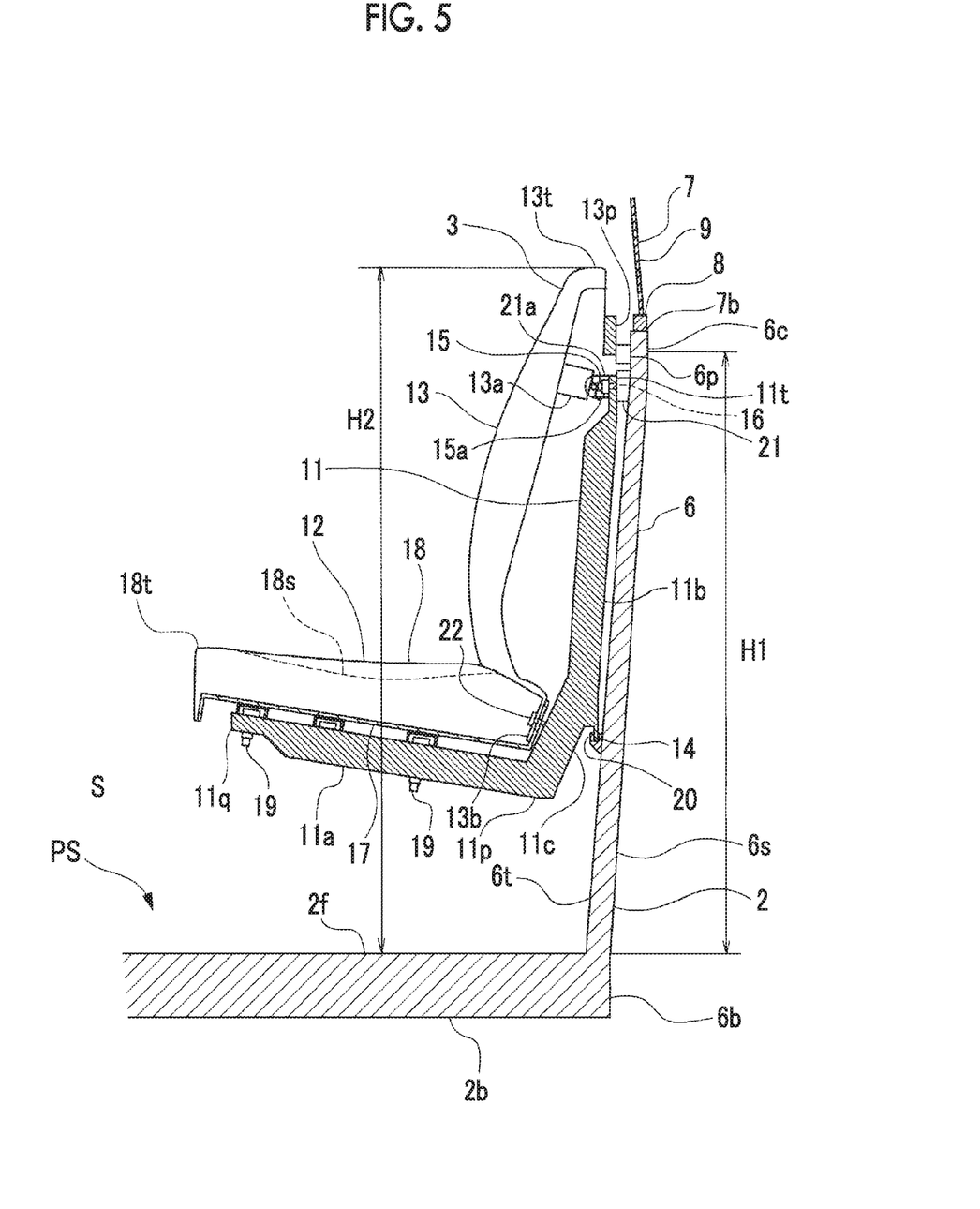
FIG. 5 is a sectional view showing an attachment structure of a seat with respect to a side wall of the vehicle in the embodiment of the present invention.

As shown in FIG. 5, preferably, the expanded portion 6c is disposed within a range of a height H1 from 600 mm to 1100 mm with respect to the vehicle floor surface 2f on the upper surface side of the base 2b, more preferably, within a range of a height H1 from 700 mm to 1000 mm, and most preferably, within a range of a height H1 from 800 mm to 900 mm.

As shown in FIG. 1, each of the base 2b of the vehicle body 2 and a roof 2r forming the ceiling surface of the vehicle body 2 is formed in an approximately flat plate shape. In the present embodiment, a sectional shape in a vertical surface orthogonal to the forward and backward directions of the vehicle body 2 is formed in an approximately hexagonal shape by the base 2b, the roof 2r, and the side walls 6.

As shown in FIG. 2, the doors 5 are each provided on the side walls 6 on both sides in the width direction of the vehicle body 2. Each of the doors 5 includes a door rail 5a and side sliding doors 5b. The door rail 5a is provided on an upper portion of a vehicle outer side surface 6s of the side wall 6 of the vehicle body 2 facing the outside in the width direction so as to extend in the forward and backward directions. The side sliding doors 5b are suspended from the door rail 5a. The side sliding doors 5b slide in the direction along the door rail 5a on the outside in the width direction of the vehicle outer side surface 6s of the side wall 6 so as to be openable and closable.

Here, as shown in FIG. 1, each of the door rails 5a is provided inward in the vehicle width direction so as not to protrude outward in the vehicle width direction from the expanded portion 6c of the side wall 6 becoming the vehicle maximum width dimension of the vehicle body 2.

In addition, the door rail 5a may be provided not only above the expanded portion 6c but also below the expanded portion 6c. Moreover, the door rails 5a may be provided on both sides above and below the expanded portion 6c.

As shown in FIG. 2, window portions 7 are provided on the side walls 6 on both sides in the width direction of the vehicle body 2 at a position at which the window portions 7 do not interfere with the side sliding doors 5b of the closed door 5. As shown in FIG. 5, each of the window portions 7 includes a glass 9 which is fitted into an opening portion 8 formed in the side wall 6. Here, as shown in FIG. 5, the window portion 7 is disposed above the expanded portion 6c which is the intermediate portion of the side wall 6 in the up and down directions.

Figure 3:
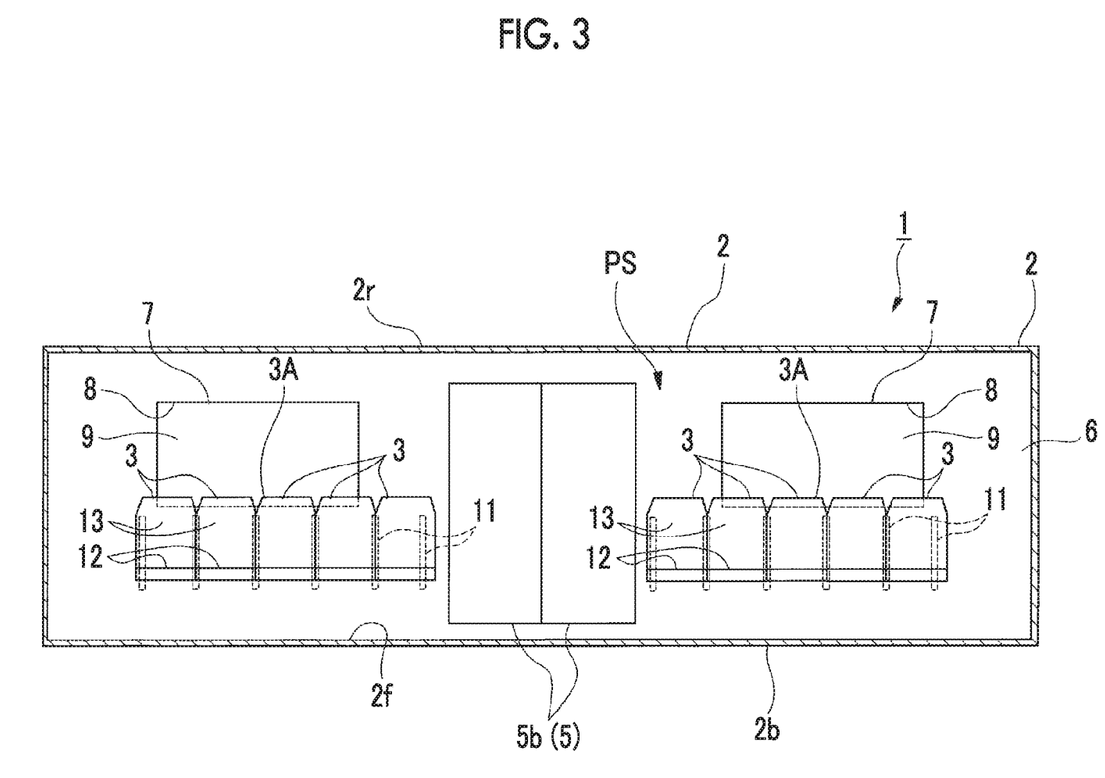
FIG. 3 is a side sectional view showing an internal structure of the vehicle in the embodiment of the present invention.
Figure 4:
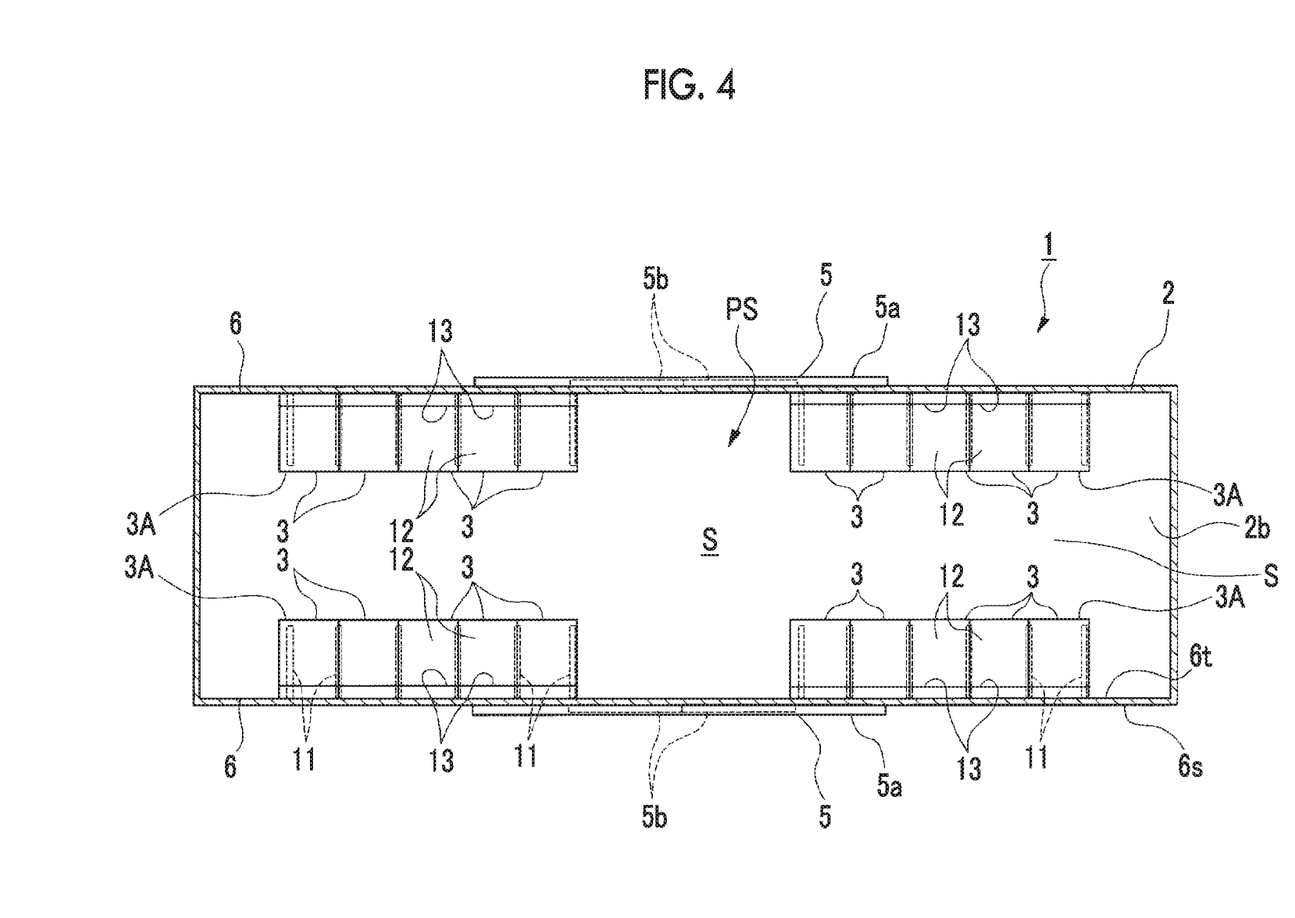
FIG. 4 is a planar sectional view showing the internal structure of the vehicle in the embodiment of the present invention.

As shown in FIGS. 3 and 4, a plurality of seats 3 are provided inside the vehicle body 2. The plurality of seats 3 are provided to be arranged to be adjacent to each other in the forward and backward directions of the vehicle body and thus, configure a long seat 3A. Here, a seat 3 may be provided inside the vehicle body 2 as a single body.

The seats 3 are provided on the side wall 6 of the vehicle 1 so as to face the inside in the vehicle width direction. Each of the seats 3 includes frames 11, seat surfaces 12, and seatbacks 13.

A plurality of frames 11 are disposed at intervals in the longitudinal direction of the vehicle body 2. In this embodiment, the frames 11 are disposed on both sides in a seat width direction (the longitudinal direction of the vehicle body 2) of each seat 3.

As shown in FIG. 5, each frame 11 includes a seat surface support portion 11a and a rear surface support portion 11b. The seat surface support portion 11a extends in a vehicle width direction above the vehicle floor surface 2f of the vehicle body 2. The rear surface support portion 11b extends in the up and down directions along a vehicle inner side surface 6t facing the inside of the side wall 6 in the vehicle width direction.

Accordingly, each frame 11 is formed in an approximately L shape as a whole.

A connection arm portion 11c is integrally formed with the lower end of the rear surface support portion 11b of each frame 11. The connection arm portion 11c is inclined inward in the vehicle width direction toward the lower side and is connected to one end 11p of the seat surface support portion 11a. The seat surface support portion 11a is inclined to gradually extend upward from the one end 11p side connected to the lower end of the connection arm portion 11c toward the other end 11q on the inside in the vehicle width direction.

A locking claw 14 which vertically protrudes downward is formed on the lower end of the rear surface support portion 11b of each frame 11. A bolt insertion hole 16 into which an attachment bolt 15 is inserted is formed on the upper end of the rear surface support portion 11b.

A locking claw 14 is locked to a locking groove 20 which is formed on the vehicle inner side surface 6t of the side wall 6. The locking groove 20 is formed in a recess shape which is recessed downward and extends in the longitudinal direction of the vehicle body 2.

The attachment bolt 15 inserted into the bolt insertion hole 16 is attached to a fixed base 21 which is formed on the vehicle inner side surface 6t of the side wall 6. Accordingly, an upper end 11t of the rear surface support portion 11b of the frame 11 is fixed to the fixed base 21 in a state of abutting on the fixed base 21. Here, for example, as a specific structure, the fixed base 21 becomes a rail which extends in the longitudinal direction of the vehicle body 2. A bolt head of the attachment bolt 15 can be inserted into the rail from the end in the longitudinal direction. In a state where the bolt head is inserted into the rail such that a screw portion of the attachment bolt 15 protrudes toward the inside of the vehicle in the width direction, the screw portion is fixed to the upper end 11t of the rear surface support portion 11b by a nut 15a. Accordingly, the frame 11 is fixed to the side wall 6 via the rail.

The fixed base 21 is formed on the vehicle inner side surface 6t of the side wall 6 below the expanded portion 6c by a predetermined dimension.

The seat surface 12 is formed to extend from the lower end of the seatback 13 toward the inside in the vehicle width direction. The seat surface 12 includes a seat surface base plate 17 which is disposed on the seat surface support portion 11a of the frame 11 and a seat surface cushion 18 which is provided on the seat surface base plate 17.

The seat surface base plate 17 is formed to be continuous in the longitudinal direction of the vehicle body 2. The seat surface base plate 17 is provided over the seat surface support portions 11a of the plurality of frames 11 disposed at intervals in the longitudinal direction of the vehicle body 2. The seat surface base plate 17 is fixed to be fastened to the seat surface support portions 11a of the frames 11 by the bolts 19.

The seat surface cushion 18 is separated for each passenger. The seat surface cushion 18 is formed of an elastic material such as foamed urethane. The seat surface cushion 18 is fixed to the seat surface base plate 17 by a hook structure, a bolt (not shown), or the like to cover the seat surface base plate 17 from above. Accordingly, the upper surface of the seat surface cushion 18 becomes a seating surface 18s on which passenger seats.

A tip portion 18t inside the seat surface cushion 18 in the vehicle width direction is provided to protrude inward in the vehicle width direction from the other end 11q of the seat surface support portion 11a. For example, a length dimension in the forward and backward directions (directions which coincide with the vehicle width direction) of the seat surface cushion 18 is approximately 500 mm. In addition, the seat surface cushion 18 is provided in a state of entering the lower portion of the seatback 13 by approximately 50 mm.

The seatback 13 is separated for each passenger. The seatback 13 is provided so as to cover the rear surface support portion 11b of the frame 11 from the inside in the vehicle width direction. In the seatback 13, an upper end 13t thereof protrudes upward from the upper end 11t of the rear surface support portion 11b of the frame 11, the expanded portion 6c of the side wall 6, and the lower edge 7b of the window portion 7. Preferably, the upper end 13t of the seatback 13 may be set to a height H2 of a range from 700 mm to 1200 mm with respect to the vehicle floor surface 2f on the upper surface side of the base 2b, more preferably, a height H2 of a range from 800 mm to 1100 mm, and most preferably, a height H2 of a range from 900 mm to 1000 mm.

An abutment portion 13p which abuts on a portion 6p corresponding to the expanded portion 6c on the vehicle inner side surface 6t of the side wall 6 is provided at a portion of a rear surface side of the upper end 13t of the seatback 13 which faces the side wall 6 and protrudes farthest toward the side wall 6 side.

A bracket 13a protruding toward the side wall 6 is provided at a position close to the upper end 13t of the seatback 13. A bracket 21a which protrudes in a direction separated from the side wall 6 is provided on the fixed base 21. Similarly to the frame 11, for example, the bracket 21a is fixed to the fixed base 21 which is the rail by a bolt and a nut. The bracket 13a is hooked to the bracket 21a from above, and thus, the seatback 13 is fixed to the side wall 6. The position at which the bracket 13a and the bracket 21a are provided becomes an approximately intermediate position of each seatback 13 in the seat width direction.

The lower end 13b of the seatback 13 is fixed to the seat surface base plate 17 by a fastener 22.

The seatback 13 is formed of an elastic material such as foamed urethane. The seatback 13 may be inclined by 15° outward in the vehicle width direction upward in a height direction of the vehicle 1. That is, a torso angle may be 150°.

According to the above-described vehicle 1, the abutment portion 13p which is the portion of the rear surface of the seatback 13 of the seat 3 which protrudes farthest toward the side wall 6 side is disposed so as to face the portion 6p on the vehicle inner side surface 6t of the side wall 6 facing the expanded portion 6c. Accordingly, it is possible to dispose the seat 3 at the position closest to the outside in the vehicle width direction. Therefore, a space S such as a passageway formed between seats 3 on both sides in the vehicle width direction can be secured to the maximum width. As a result, it is possible to effectively use a space inside the vehicle body 2.

The upper end 11t of the frame 11 is fixed at the position below the portion 6p of the vehicle inner side surface 6t of the side wall 6 facing the expanded portion 6c. Accordingly, compared to a case where the frame 11 is fixed to the expanded portion 6c, the frame 11 can be more easily and reliably fixed.

The upper end 13t of the seatback 13 protrudes upward from the lower edge 7b of the window portion 7. According to this configuration, the height of the seatback 13 is largely secured while the seat 3 is mounted at the position closest to the outside in the vehicle width direction, and thus, it is possible to improve comfort at the time of seating.

The lower edge 7b of the window portion 7 is positioned below the upper end 13t of the seatback 13. Accordingly, it is possible to increase the dimension in the height direction of the window portion 7 and it is possible to increase the feeling of opening in the space inside the vehicle body 2. Moreover, the dimension of the window portion 7 can be increased, which leads to an improvement in the design of the exterior.

In the side wall 6 of the vehicle body 2, the door rail 5a extending in the travel direction is provided on the vehicle outer side surface 6s facing the outside in the width direction, and the side sliding doors 5b sliding along the door rail 5a are provided on the outside in the width direction from the vehicle outer side surface 6s of the side wall 6. In addition, the door rail 5a is disposed above the expanded portion 6c and is provided on the inside in the width direction from the expanded portion 6c.

Here, if the door rail 5a and the side sliding doors 5b are provided on the outside of the side wall 6 in the width direction, in general, according to the regulation of vehicle limits, it is necessary to install the side wall 6 of the vehicle body 2 on the inside in the vehicle width direction. As a result, the dimension in the internal space of the vehicle body 2 in the width direction is decreased. Meanwhile, the expanded portion 6c is disposed below the door rail 5a, and thus, the maximum width dimension of the internal space of the vehicle body 2 can be secured.

In the side wall 6, the upper end 6a and the expanded portion 6c are linearly connected to each other and the lower end 6b and the expanded portion 6c are linearly connected to each other, and thus, the sectional shape of the vehicle body 2 is hexagonal.

According to this configuration, the seat 3 is disposed to be close to the outside in the width direction, and thus, the outline of the vehicle body 2 is formed to be characteristic while the space S such as a passageway formed between the seats 3 on both sides in the vehicle width direction is secured to the maximum width.

In addition, the present invention is not limited to the above-described embodiment, and various modifications can be applied to the above-described embodiment within a scope which does not depart from the gist of the present invention. That is, the specific shapes, configurations, or the like described in the embodiment are only examples and can be appropriately changed.

For example, in the above-described embodiment, in the side wall 6, the portion between the upper end 6a and the expanded portion 6c and the portion between the expanded portion 6c and the lower end 6b are formed in a flat plate shape. However, the present invention is not limited to this. For example, the side wall 6 may be formed in a curved sectional shape as long as the expanded portion 6c in the side wall 6 protrudes farthest toward the outside in the width direction. In addition, the sectional shape of the vehicle body 2 is not limited to a hexagonal shape. For example, the sectional shape may be a polygonal shape such as an octagonal shape. Moreover, in the above-described embodiment, the base 2b of the vehicle body 2 and the roof 2r forming the ceiling surface of the vehicle body 2 are approximately flat plate shapes. However, the present invention is not limited to this, and for example, the base 2b and the roof 2r may be a curved plate shape or a bent plate shape.

In addition, the door 5 may be provided on the vehicle inner side surface 6t facing the inside of the side wall 6 in the width direction.

In addition, the configurations of the above-described embodiment and modification examples may be appropriately combined.

INDUSTRIAL APPLICABILITY

According to the above-described vehicle, the space such as a passageway is secured to the maximum width, and thus, it is possible to effectively use the space inside the vehicle.

REFERENCE SIGNS LIST

1: vehicle
2: vehicle body
2b: base
2f: vehicle floor surface
2r: roof
3: seat
3A: long seat
4: traveling device
4g: guide wheel
4r: wheel
5: door
5a: door rail
5b: side sliding door
6: side wall
6a: upper end
6b: lower end
6c: expanded portion
6s: vehicle outer side surface
6t: vehicle inner side surface
6p: portion
7: window portion
7b: lower edge
8: opening portion
9: glass
11: frame
11a: seat surface support portion
11b: rear surface support portion
11c: connection arm portion
11p: one end
11q: other end
11t: upper end
12: seat surface
13: seatback
13a: bracket
13b: lower end 13*p*: abutment portion
13*t*: upper end
14: locking claw
15: attachment bolt
15*a*: nut
16: bolt insertion hole
17: seat surface base plate
18: seat surface cushion
18*s*: seating surface
18*t*: tip portion
19: bolt
20: locking groove
21: fixed base
21*a*: bracket
22: fastener
PS: passenger compartment
S: space

The invention claimed is:

1. A vehicle comprising:
a vehicle body which is formed in a box shape and includes side walls on both sides in a width direction orthogonal to a travel direction and an expanded portion which is formed between an upper end and a lower end of the side wall so as to be expanded outward in the width direction from the upper end and the lower end;
a seat which is provided inside the vehicle body and includes a seatback along the side wall and a seat surface extending from the seatback inward in the width direction of the vehicle body, and in which a portion of a rear surface of the seatback which faces the side wall and protrudes farthest toward a side wall side is positioned at a position facing the expanded portion of a vehicle inner side surface of the side wall;
a door rail which is provided on a vehicle outer side surface of the side wall of the vehicle body so as to extend in the travel direction; and
a side sliding door which is provided on an outside in the width direction from the vehicle outer side surface of the side wall and slides along the door rail,
wherein the door rail is disposed in at least one of the upper side and a lower side of the expanded portion and is provided inward in the width direction of the vehicle body from the expanded portion.

2. The vehicle according to claim 1,
wherein the seat includes a frame which is fixed to the side wall and supports the seatback and the seat surface, and
wherein an upper end of the frame is fixed to the side wall at a position below the position of the vehicle inner side surface of the side wall facing the expanded portion.

3. The vehicle according to claim 1, further comprising:
a window portion which is provided on the side wall,
wherein an upper end of the seatback protrudes upward from a lower edge of the window portion.

4. The vehicle according to claim 1,
wherein the upper end and the expanded portion are linearly connected to each other and the lower end and the expanded portion are linearly connected to each other in the side wall, and a sectional shape of the vehicle body in a vertical surface orthogonal to the travel direction is hexagonal.

\* \* \* \* \*